(12) United States Patent
Miyoshi

(10) Patent No.: US 9,639,076 B2
(45) Date of Patent: May 2, 2017

(54) SWITCH DEVICE, INFORMATION PROCESSING DEVICE, AND CONTROL METHOD OF INFORMATION PROCESSING DEVICE

(71) Applicant: FUJITSU LIMITED, Kawasaki-shi, Kanagawa (JP)

(72) Inventor: Takashi Miyoshi, Ohta (JP)

(73) Assignee: FUJITSU LIMITED, Kawasaki (JP)

( * ) Notice: Subject to any disclaimer, the term of this patent is extended or adjusted under 35 U.S.C. 154(b) by 211 days.

(21) Appl. No.: 14/566,046

(22) Filed: Dec. 10, 2014

(65) Prior Publication Data

US 2015/0253993 A1    Sep. 10, 2015

(30) Foreign Application Priority Data

Mar. 6, 2014   (JP) ................. 2014-043584

(51) Int. Cl.
*G06F 11/00* (2006.01)
*G05B 15/02* (2006.01)
*G06F 11/34* (2006.01)
*G06F 11/22* (2006.01)
*G06F 11/277* (2006.01)

(52) U.S. Cl.
CPC ........... *G05B 15/02* (2013.01); *G06F 11/34* (2013.01); *G06F 11/22* (2013.01); *G06F 11/277* (2013.01)

(58) Field of Classification Search
USPC .............................. 714/47.2, 47.3
See application file for complete search history.

(56) References Cited

U.S. PATENT DOCUMENTS

| | | | | |
|---|---|---|---|---|
| 5,363,380 A | * | 11/1994 | Shinohara | G06F 11/2236 714/25 |
| 6,938,188 B1 | * | 8/2005 | Kelleher | G06F 11/221 714/43 |
| 2005/0015213 A1 | * | 1/2005 | Somervill | G06F 11/2236 702/117 |

FOREIGN PATENT DOCUMENTS

JP   63-093048   4/1988
JP   03-214341   9/1991

* cited by examiner

*Primary Examiner* — Bryce Bonzo
*Assistant Examiner* — India Davis
(74) *Attorney, Agent, or Firm* — Staas & Halsey LLP

(57) ABSTRACT

A switch apparatus for connecting an arithmetic processing apparatus and a control apparatus that controls the processing apparatus to an I/O apparatus is disclosed, the switch apparatus includes: a switch unit that connects either the processing apparatus or the control apparatus to the I/O; a first input/output control unit that outputs a first command that is received from the processing apparatus to the I/O through the switch unit, receives a response from the I/O that is operated based on the first command, through the switch unit, and outputs the received response to the processing apparatus; and a second input/output control unit that outputs a second command that is received from the control apparatus, to the I/O through the switch unit, receives a test result of the I/O that is tested based on the second command, through the switch unit, and outputs the received test result to the control apparatus.

14 Claims, 12 Drawing Sheets

FIG. 6

| DEVICE NAME | DESTINATION ID | DEVICE TYPE | STATE |
|---|---|---|---|
| DEV0 | (3,0,1) | GPU | RESET |
| DEV1 | (3,1,1) | SSD | DISABLED |
| DEV2 | (3,2,1) | NIC-A | ENABLED |
| ------- | ------- | ------- | ------- |

CFGTBL (3,2,1): BUS NUMBER, DEVICE NUMBER, FUNCTION NUMBER

FIG. 7

TESTTBL

| DEVICE TYPE | READ SPACE | PERMISSION FLAG | THRESHOLD VALUE | PROGRAM NAME |
|---|---|---|---|---|
| NIC-A | Bar0: addr1-addr2 | PERMISSION | 1 KB/s | BISTPRG1 |
| NIC-B | Bar1: addr3-addr4 | PERMISSION | 1 KB/s | BISTPRG2 |
| HBA-A | Bar2: addr5-addr6 | PERMISSION | 1 KB/s | BISTPRG3 |
| HBA-B | Bar3: addr7-addr8 | PERMISSION | 1 KB/s | BISTPRG4 |
| HCA-A | Bar4: addr9-addr10 | PROHIBITION | — | — |
| SSD | Bar5: addr11-addr12 | PERMISSION | 1 KB/s | BISTPRG5 |
| GPU | Bar6: addr13-addr14 | PERMISSION | 1 KB/s | BISTPRG6 |
| ...... | ...... | ...... | ...... | ...... |

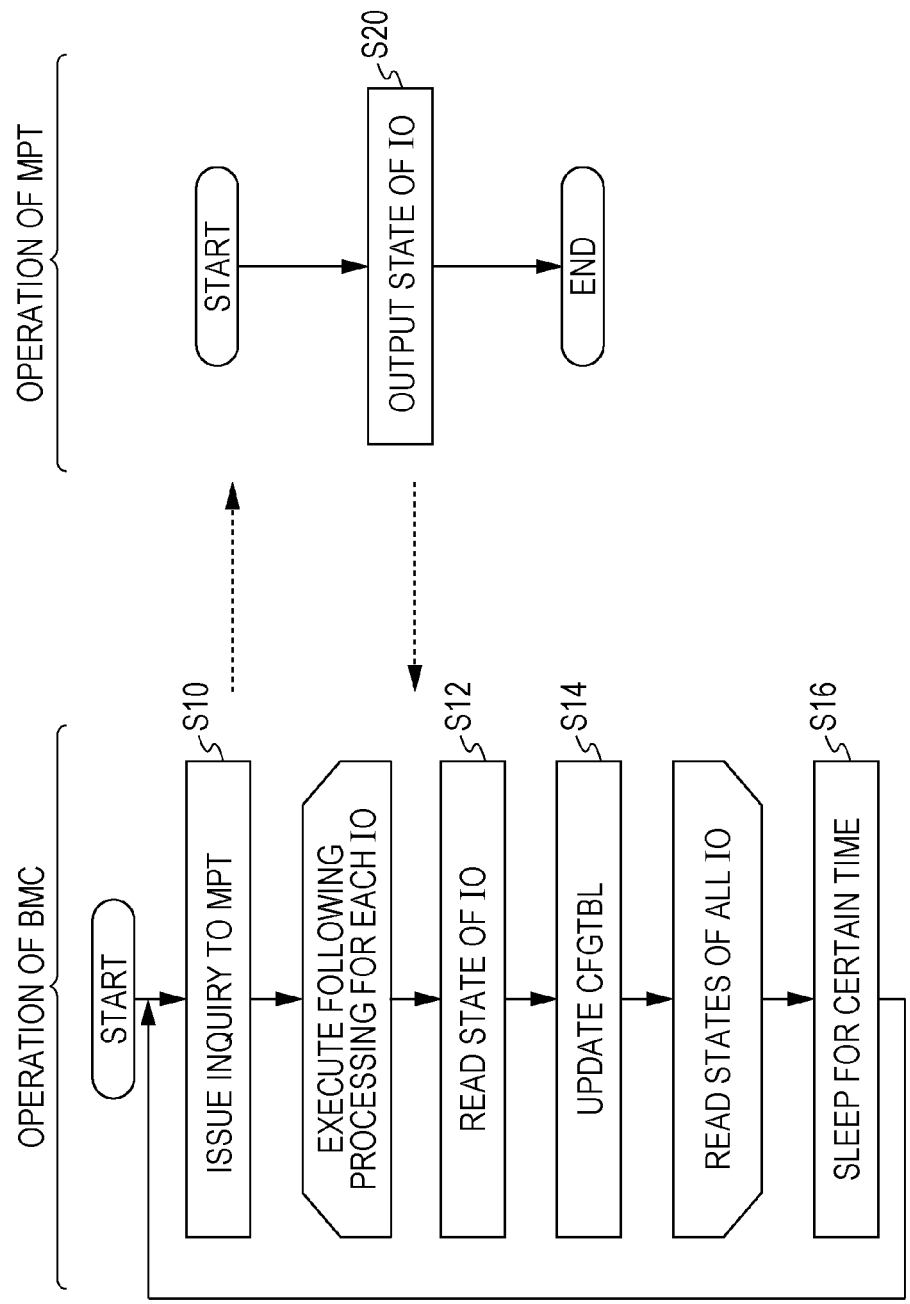

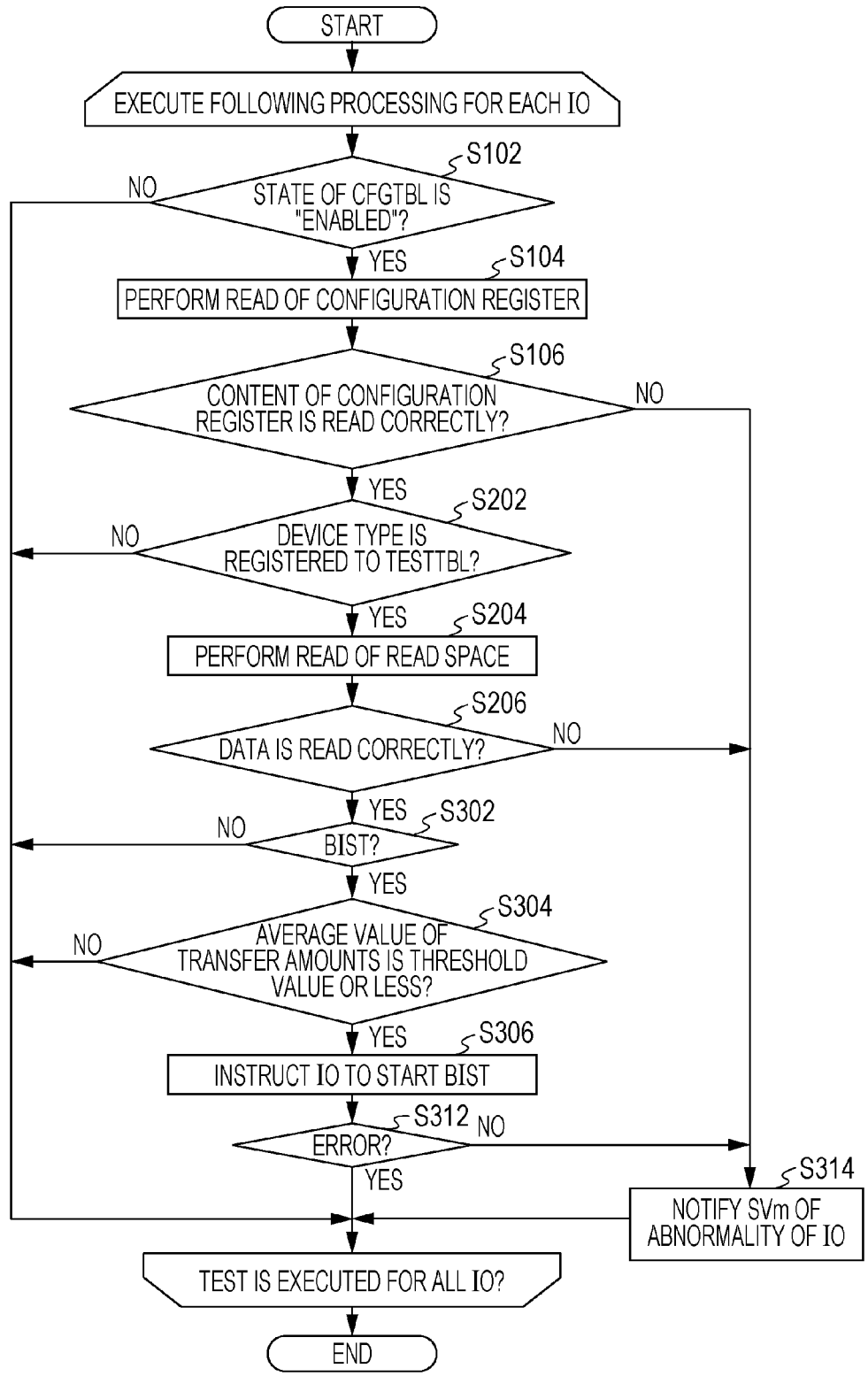

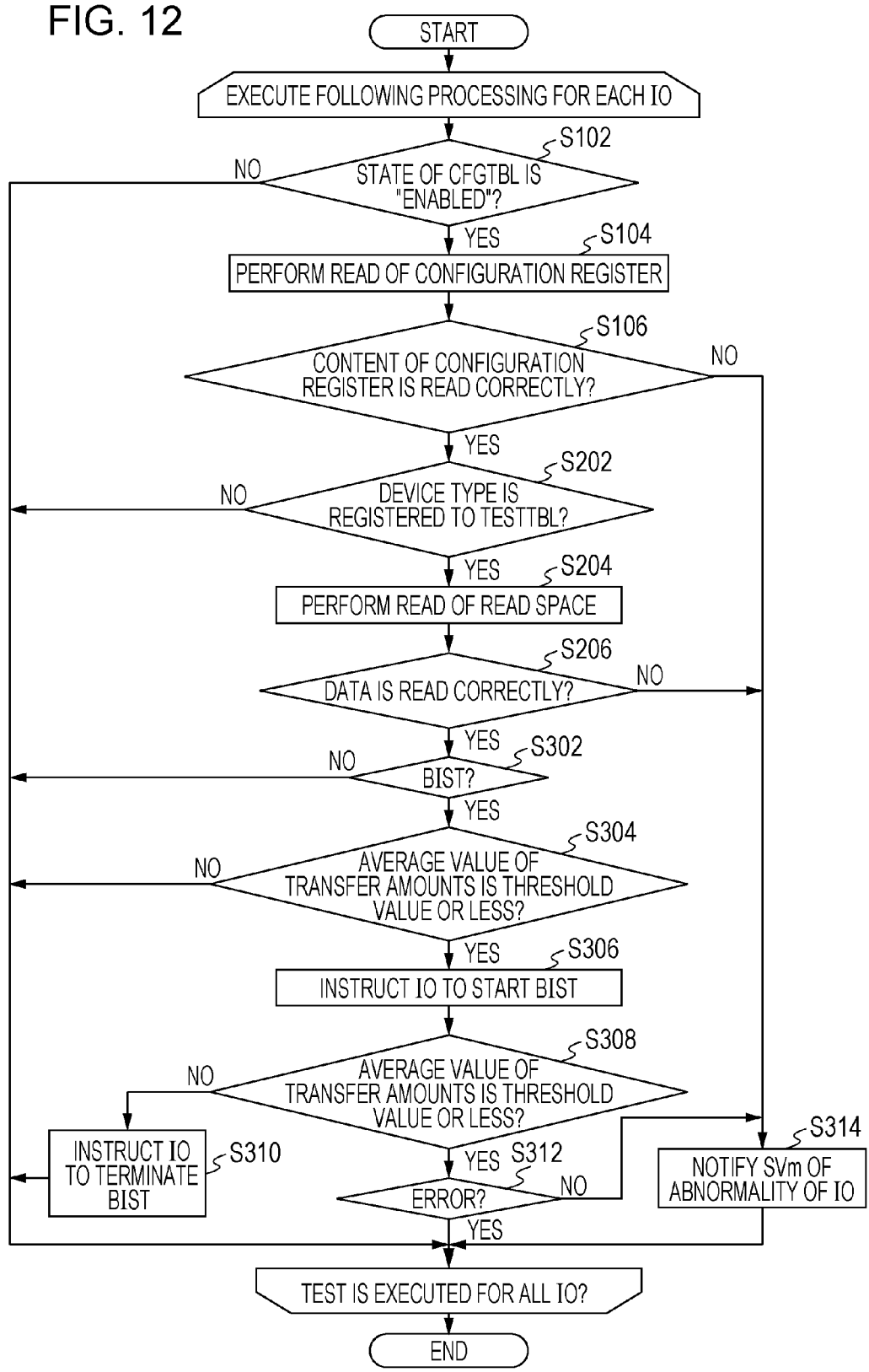

SWITCH DEVICE, INFORMATION PROCESSING DEVICE, AND CONTROL METHOD OF INFORMATION PROCESSING DEVICE

CROSS-REFERENCE TO RELATED APPLICATION

This application is based upon and claims the benefit of priority of the prior Japanese Patent Application No. 2014-043584, filed on Mar. 6, 2014, the entire contents of which are incorporated herein by reference.

FIELD

The embodiments discussed herein are related to a switch apparatus, an information processing apparatus, a control method of the information processing apparatus, and a non-transitory storage medium that stores a control program of the information processing apparatus.

BACKGROUND

A method has been proposed by which, in a system that includes an arithmetic processing apparatus, a main storage apparatus, and an input/output apparatus, a test of the input/output apparatus is executed using a test processor that in operation when the arithmetic processing apparatus is not in operation (for example, see Japanese Laid-open Patent Publication No. 63-93048).

In addition, an information processing apparatus has been proposed that connects a main memory control apparatus in which a central processing unit (CPU) is connected to a service processor, to an input/output apparatus, through a channel processor and an input/output control apparatus using a plurality of routes.

In such a kind of the information processing apparatus, when the service processor specifies a route and checks the state of the input/output apparatus, the normality of the route is diagnosed when the information processing apparatus is in operation (for example, see Japanese Laid-open Patent Publication No. 3-214341).

However, in a case in which the test processor that is in operation when the arithmetic processing apparatus is not in operation executes a test of the input/output apparatus, the processing by the arithmetic processing apparatus is terminated in the middle of the test of the input/output apparatus. In addition, when the central processing unit and the service processor are connected to a channel processor through the main memory control apparatus, the range in which the service processor may perform diagnosis is merely limited to the connection route.

An object of a switch apparatus, an information processing apparatus, a control method of the information processing apparatus, and a control program of the information processing apparatus that are discussed herein is to minimize the impact on the processing performance of an arithmetic processing apparatus, and to execute a test of an input/output apparatus that is connected to the arithmetic processing apparatus.

SUMMARY

According to an aspect of the invention, a switch apparatus for connecting an arithmetic processing apparatus and a control apparatus that controls the processing apparatus to an I/O apparatus is disclosed, the switch apparatus includes: a switch unit that connects either the processing apparatus or the control apparatus to the I/O; a first input/output control unit that outputs a first command that is received from the processing apparatus to the I/O through the switch unit, receives a response from the I/O that is operated based on the first command, through the switch unit, and outputs the received response to the processing apparatus; and a second input/output control unit that outputs a second command that is received from the control apparatus, to the I/O through the switch unit, receives a test result of the I/O that is tested based on the second command, through the switch unit, and outputs the received test result to the control apparatus.

According to another aspect of the invention, a control method of an information processing apparatus that includes an arithmetic processing apparatus that executes calculation, a control apparatus that controls the arithmetic processing apparatus, an input/output apparatus that performs input and output of information, and a switch apparatus that includes a switch unit that connects the input/output apparatus to one of the arithmetic processing apparatus and the control apparatus, is also disclosed.

According to still another aspect of the invention, a non-transitory storage medium having stored therein a control program that controls an information processing apparatus that includes an arithmetic processing apparatus that executes calculation, a control apparatus that controls the arithmetic processing apparatus, an input/output apparatus that performs input and output of information, a switch apparatus including a switch unit that connects the input/output apparatus to one of the arithmetic processing apparatus and the control apparatus, is also disclosed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of a configuration table illustrated in FIG. 2;

FIG. 7 is a diagram illustrating an example of a test table illustrated in FIG. 2;

FIG. 8 is a diagram illustrating an example of an operation in which the information processing apparatus illustrated in FIG. 2 updates the configuration table;

FIG. 11 is a diagram illustrating an example of an operation flow of the test illustrated in FIG. 9; and FIG. 12 is a diagram illustrating a further example of the operation flow of the test illustrated in FIG. 9.

DESCRIPTION OF EMBODIMENTS

Embodiments are described below with reference to drawings.

Figure 1:
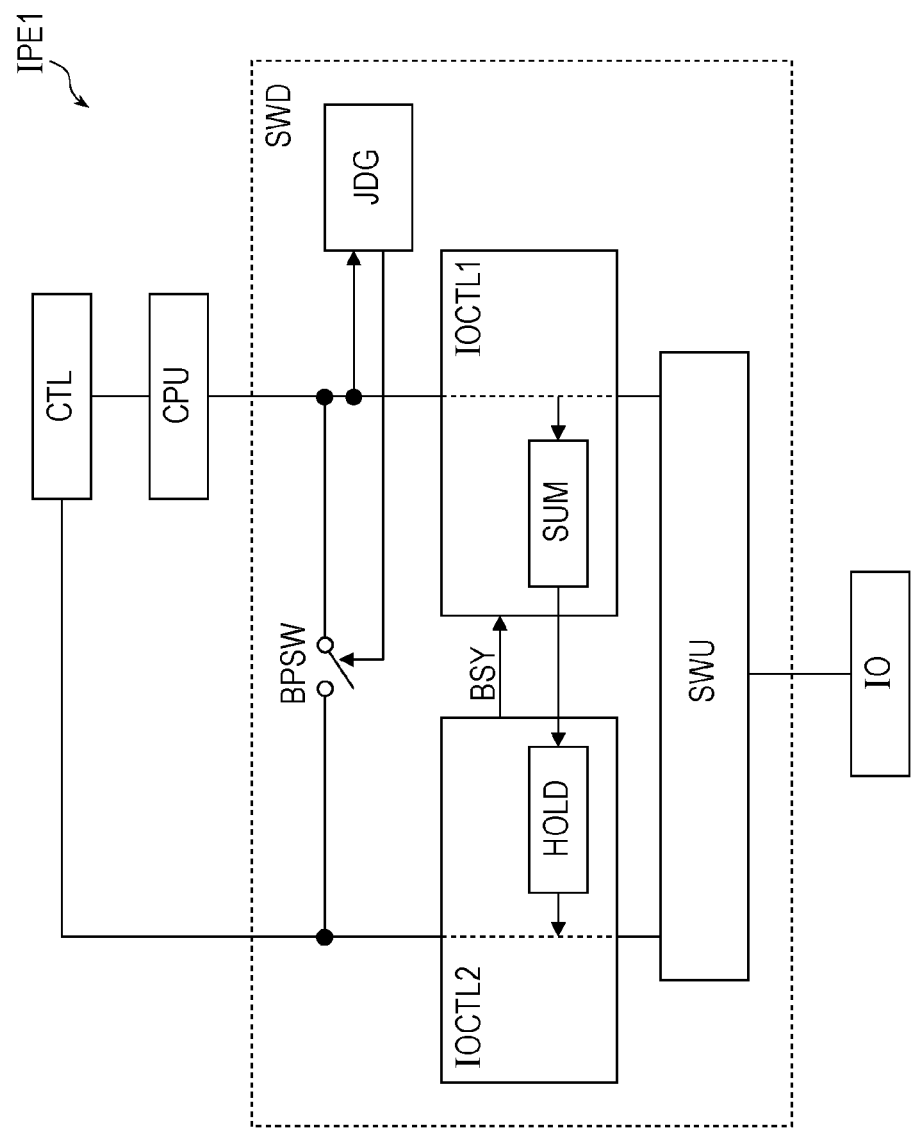
FIG. 1 is a diagram illustrating a switch apparatus and an information processing apparatus according to an embodiment.

FIG. 1 illustrates a switch apparatus and an information processing apparatus according to an embodiment. In FIG. 1, an information processing apparatus IPE1 includes a processor CPU, a controller CTL, a switch apparatus SWD, and an input/output apparatus IO. The processor CPU is an example of an arithmetic processing apparatus that executes calculation, and the controller CTL is an example of a control apparatus that controls the processor CPU. The switch apparatus SWD includes a switch unit SWU that connects one of the processor CPU and the controller CTL to the input/output apparatus IO, and input/output control units IOCTL1 and IOCTL2. A plurality of input/output apparatuses IO may be connected to the switch unit SWU.

For example, the input/output apparatus IO is a network interface, a host bus adapter, a hard disk drive apparatus, a solid state drive apparatus, or the like. For example, the input/output apparatus IO is connected to the processor CPU and the controller CTL through the switch apparatus SWD by an interface of peripheral component interconnect (PCI) express (registered trademark). However, the input/output apparatus IO may be connected to the processor CPU and the controller CTL by an interface of further standard.

The switch apparatus SWD may include a determination unit JDG and a transfer unit BPSW, and the input/output control unit IOCTL1 may include a summation unit SUM, and the input/output control unit IOCTL2 may include a holding unit HOLD. In addition, the input/output control unit IOCTL2 may include a function that outputs a busy signal BSY to the input/output control unit IOCTL1. Output timing of the busy signal BSY and the operation of the input/output control unit IOCTL1 that has received the busy signal BSY are described later. In the operations of the controller CTL and the input/output control units IOCTL1 and IOCTL2, a control method of the information processing apparatus according to the embodiment is described.

The input/output control unit IOCTL1 outputs a first command that is received from the processor CPU, to the input/output apparatus IO through the switch unit SWU. In addition, the input/output control unit IOCTL1 receives the response from the input/output apparatus IO that is in operation based on the first command, through the switch unit SWU, and outputs the received response to the processor CPU. The input/output control unit IOCTL2 outputs a second command that is received from the controller CTL, to the input/output apparatus IO through the switch unit SWU. In addition, the input/output control unit IOCTL2 receives the result of a test of the input/output apparatus IO, which is executed based on the second command, through the switch unit SWU, and outputs the received test result to the controller CTL.

In the switch apparatus SWD illustrated in FIG. 1, a route of the second command that is output from the controller CTL to the switch unit SWU is provided separately from a route of the first command that is output from the processor CPU to the switch unit SWU. Therefore, the second command that is used to test the input/output apparatus IO is not transmitted to a route between the processor CPU and the switch unit SWU. Thus, as compared with a case in which the controller CTL and the processor CPU are connected to the switch apparatus SWD through a shared bus, a probability that a conflict occurs between the second command that is output from the controller CTL and the first command that is output from the processor CPU may be reduced. That is, the impact on the processing performance of the processor CPU due the test of the input/output apparatus IO through the controller CTL may be minimized.

The summation unit SUM of the input/output control unit IOCTL1 sums up transfer amounts of pieces of data that are included in the first command from the processor CPU. That is, the summation unit SUM sums up the size of data that is written to the input/output apparatus IO and the size of data that is read from the input/output apparatus IO.

The holding unit HOLD of the input/output control unit IOCTL2 holds an average value of the transfer amounts of the pieces of data that are summed up in the summation unit SUM. For example, the input/output control unit IOCTL2 may calculate the average value of the transfer amounts by dividing a difference between transfer amounts of pieces of data that have been read twice at a time interval from the summation unit SUM, by the time interval. The controller CTL may read the average vale that is held in the holding unit HOLD by outputting a command that is used to access the holding unit HOLD, to the input/output control unit IOCTL2. As a result, when the average value of the transfer amounts of the pieces of data in the input/output apparatus IO that is accessed by the processor CPU is a certain threshold value or less, the controller CTL may execute a test of the input/output apparatus IO through the input/output control unit IOCTL2. That is, when a certain condition (threshold value or less) is satisfied in the access to the input/output apparatus IO by the processor CPU, the controller CTL may instruct the input/output control unit IOCTL2 to start the test of the input/output apparatus IO. As a result, the frequency of the test of the input/output apparatus IO may be reduced as compared with a case in which the test is executed for each certain cycle, and the probability may be reduced that a conflict between the second command that is output from the controller CTL and the first command that is output from the processor CPU.

In addition, the input/output control unit IOCTL2 outputs a busy signal BSY to the input/output control unit IOCTL1, during a time period from output of the second command to reception of the test result. The input/output control unit IOCTL1 prohibits output of the first command to the switch unit SWU when the busy signal BSY is being received. As a result, when an access to the input/output apparatus IO or a test of the input/output apparatus IO is executed based on the second command, it may be avoided that a conflict occurs between an access to the input/output apparatus IO from the controller CTL and an access to the input/output apparatus IO from the processor CPU. As a result, the erroneous operation of the processor CPU may be avoided. When a plurality of input/output apparatuses IO is connected to the switch unit SWU, the busy signal BSY is output for each second command that is output to the input/output apparatus IO, and the prohibition of the output of the first command is set for each of the input/output apparatuses IO.

When the determination unit JDG determines that the first command is an assignment command that is used to instruct assignment of the input/output apparatus IO, the determination unit JDG outputs a control signal to the transfer unit BPSW. The transfer unit BPSW connects the input/output control units IOCTL1 and IOCTL2 with each other, based on the control signal that has been output from the determination unit JDG, and transfers the assignment command that has been output to the switch unit SWU from the processor CPU, to the input/output control unit IOCTL2. The transfer unit BPSW is, for example, a bypass switch that performs conduction based on determination that the command is the assignment command from the determination unit JDG. Due to the determination unit JDG and the transfer unit BPSW, the controller CTL may obtain information that indicates assignment of the input/output apparatus IO without outputting a command that is used to inquire about the assignment of the input/output apparatus IO through the input/output control unit IOCTL2. That is, the controller CTL may obtain the information that indicates the assignment of the input/output apparatus IO, without affecting the operation of the processor CPU, for example, through issuance of a request command to the input/output control unit IOCTL2.

As described above, in the embodiment illustrated in FIG. 1, the route of the first command from the processor CPU and the route of the second command from the controller CTL are provided separately from each other. Therefore, the probability may be reduced that a conflict occurs between the second command and the first command. In addition, due to the summation unit SUM and the holding unit HOLD, the frequency of a test of the input/output apparatus IO may be reduced as compared with a case in which the test is executed for each certain cycle. In addition, due to the determination unit JDG and the transfer unit BPSW, the controller CTL may obtain information that indicates assignment of the input/output apparatus IO without affecting the operation of the processor CPU.

As a result, the impact on the processing performance of the processor CPU due to the test of the input/output apparatus IO through the controller CTL may be minimized.

In addition, a conflict that occurs between an access from the controller CTL to the input/output apparatus IO and an access from the processor CPU to the input/output apparatus IO may be avoided by using a busy signal BSY, and the erroneous operation of the processor CPU may be avoided.

Figure 2:
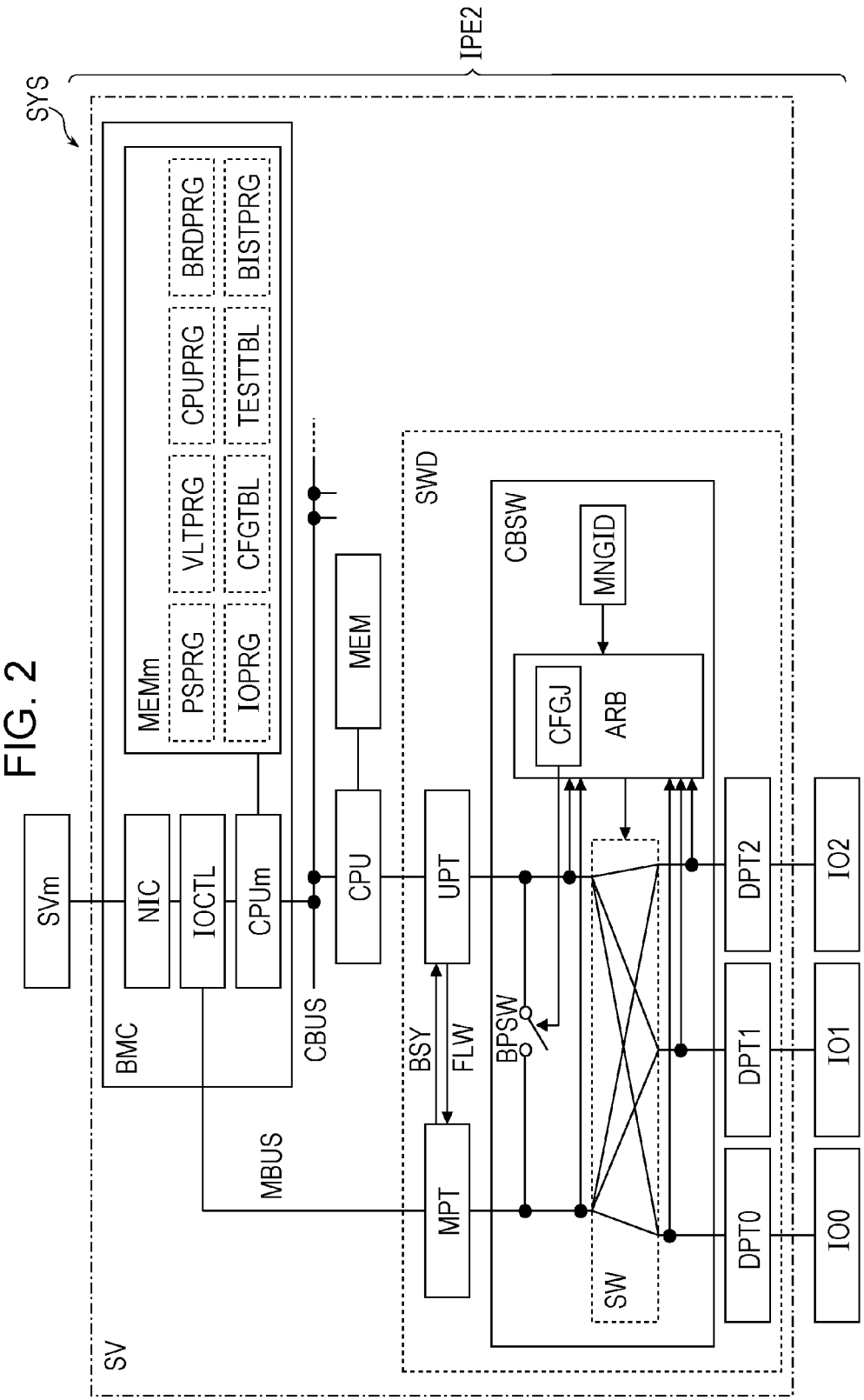
FIG. 2 is a diagram illustrating a switch apparatus and an information processing apparatus according to a further embodiment.

FIG. 2 illustrates a switch apparatus and an information processing apparatus according to a further embodiment. The same symbol is applied to an element that is the same as or similar to the element that is described in the embodiment illustrated in FIG. 1, and the detailed description is omitted herein. In FIG. 2, an information processing system SYS includes an information processing apparatus IPE2 including a server SV and input/output apparatuses IO (IO0, IO1, and IO2), and a management server SVm that manages the information processing apparatus IPE2. For example, each of the input/output apparatuses IO is a network interface, a host bus adapter, a hard disk drive apparatus, a solid state drive apparatus, or the like. For example, each of the input/output apparatuses IO is connected to the server SV through an interface of PCI express, and may be connected to the server SV through an interface of further standard.

The server SV includes a controller BMC, a processor CPU, a memory MEM, and a switch apparatus SWD. The controller BMC includes a processor CPUm, a memory MEMm, a monitor control unit IOCTL, and an interface unit NIC. For example, the controller BMC includes a function of a baseboard management controller that manages various devices such as the processor CPU that is mounted on a motherboard of the server SV.

The processor CPUm monitors and controls the state of the server SV by executing programs PSPRG, VLTPRG, CPUPRG, and BRDPRG that are stored in the memory MEMm. In addition, the processor CPUm monitors the state of each of the input/output apparatuses IO, and executes a test of the input/output apparatus IO by executing a program IOPRG that is stored in the memory MEMm.

The monitor control unit IOCTL is connected to the management server SVm through an interface unit NIC, and controls the communication with the management server SVm based on the control by the processor CPUm. In addition, the monitor control unit IOCTL is connected to a port MPT through a management bus MBUS, controls the communication with the port MPT based on the control by the processor CPUm, and monitors the state of the input/output apparatus IO. That is, the monitor control unit IOCTL is connected to the switch apparatus SWD and may access the input/output apparatus IO without through the processor CPU that is operated in order to achieve a function of the server SV. As a result, the controller BMC may instruct the port MPT to execute a test or the like of the input/output apparatus IO without imposing a load on the processor CPU, and obtain the test result from the port MPT. For example, the management bus MBUS is a bus of PCI express standard.

The interface unit NIC connects the monitor control unit IOCTL to the management server SVm that manages the server SV. In the memory MEMm, there are areas that include the programs PSPRG, VLTPRG, CPUPRG, BRDPRG, and IOPRG, a configuration table CFGTBL, a test table TESTTBL, and a program BISTPRG.

For example, the program PSPRG includes a function that controls the order of provision of power source voltage to each of the devices such as the processor CPU in the server SV, at the time of start-up of the server SV, and a function that controls the order of termination of the provision of power source voltage, at the time of termination of the server SV. For example, the program VLTPRG includes a function that controls and monitors a value such as power source voltage that is provided for each of the devices such as the processor CPU in the server SV, for example, in accordance with the control of an operation mode of the device.

The program CPUPRG includes a function that monitors the state of a temperature or the like of the processor CPU. The program BRDPRG includes a function that monitors the state of the motherboard such as a printed board on which the controller BMC, the processor CPU, and the like, are mounted. For example, the program BRDPRG includes a function that monitors the temperature of the board using a temperature sensor that is mounted on the server SV, and controls the rotational speed of a cooling fan that is mounted on the server SV in accordance with the temperature of the board. The processor CPUm is connected to the processor CPU, the temperature sensor, the cooling fan, and the like, through a control bus CBUS.

The program IOPRG includes a function that executes tests of the input/output apparatuses IO0, IO1, and IO2 that are connected to the server SV, and monitors the states of the input/output apparatuses IO0, IO1, and IO2.

The read and write of the configuration table CFGTBL and the test table TESTTBL are performed through the processor CPUm. The configuration table CFGTBL includes areas that store information on assignment of the input/output apparatuses IO0, IO1, and IO2 that are connected to the server SV, and the types and states of the input/output apparatuses IO0, IO1, and IO2. The test table TESTTBL includes areas that store test specifications when the input/output apparatuses IO0, IO1, and IO2 are tested. An example of the configuration table CFGTBL is illustrated in FIG. 6, and an example of the test table TESTTBL is illustrated in FIG. 7.

The program BISTPRG is transferred from each of the input/output apparatuses IO0, IO1, and IO2 before a built-in self test (BIST) of each of the input/output apparatuses IO0, IO1, and IO2 is executed (for example, at the time of start-up of the server SV). The program BISTPRG is executed by the processor CPUm of the controller BMC, and includes a function that controls the BIST that is executed by each of the input/output apparatuses IO0, IO1, and IO2. The memory MEMm may include a plurality of areas that store programs BISTPRG from the plurality of input/output apparatuses IO0, IO1, and IO2.

The processor CPU causes the server SV and the input/output apparatuses IO0, IO1, and IO2 that are connected to the server SV to operate as the information processing apparatus IPE2 by executing a system program that is stored in the memory MEM. The processor CPU accesses the input/output apparatuses IO0, IO1, and IO2 through a port UPT of the switch apparatus SWD. The processor CPU is connected to the switch apparatus SWD, for example, through a host bridge that includes the interface of PCI express standard.

The switch apparatus SWD includes the ports MPT, UPT, and DPTs (DPT0, DPT1, and DPT2) and a crossbar switch unit CBSW. For example, the port UPT is an upstream port that is connected to the processor CPU that causes the server SV to operate as the information processing apparatus IPE2. The port UPT transfers a packet that is received from the processor CPU through the host bridge, to one of the input/output apparatuses IO0, IO1, and IO2 through the switch apparatus SWD. In addition, the port UPT transfers a packet that is received from each of the input/output apparatuses IO0, IO1, and IO2 through the switch apparatus SWD, to the processor CPU.

The packet that is received at the port UPT from the processor CPU is an example of the first command. That is, the port UPT is an example of a first input/output control unit that outputs the first command that is received from the processor CPU, to the input/output apparatus IO, and outputs a response from the input/output apparatus IO, to the processor CPU.

The port UPT includes a function that suspends transfer of a packet to the input/output apparatus IO that is indicated by busy information BSY, from the port MPT. That is, the port UPT includes a function that prohibits output of the packet to the input/output apparatus IO that is indicated by the busy information BSY, to the crossbar switch unit CBSW when the busy information BSY is received from the port MPT. The port UPT holds the packet the transfer of which has been suspended, and the outputs the held packet to the input/output apparatus IO through the crossbar switch unit CBSW after busy information BSY indicates that the transfer is permitted.

In addition, the port UPT measures a transfer amount of data that is transferred between the port UPT and each of the input/output apparatuses IO, and outputs flow amount information FLW that indicates the transfer amount, to the port MPT. For example, the port UPT extracts the data length that is stored in the header or the like of a packet that is output from the processor CPU, as a transfer amount of the data, for each of the input/output apparatuses IO.

The port MPT includes a function that obtains information on each of the input/output apparatuses IO that are connected to the server SV, and a function that checks the operation of each of the input/output apparatuses IO. A packet that is received at the port MPT from the controller BMC is an example of the second command. That is, the port MPT is an example of a second input/output control unit that outputs the second command from the controller BMC, to the input/output apparatus IO, and outputs a test result of the input/output apparatus IO, to the controller BMC.

When the port MPT outputs a packet to each of the input/output apparatuses IO, the port MPT outputs busy information BSY to the port UPT. For example, the busy information BSY includes a busy signal that is asserted during a time from output of the packet to each of the input/output apparatuses IO, to reception of the response from each of the input/output apparatuses IO, and an identification signal that indicates the identification (ID) of the input/output apparatus IO to which the packet is output. In the following description, a symbol BSY is used as a busy signal as well.

In addition, the port MPT obtains an average value of transfer amounts of pieces of data that are transferred between the processor CPU and the input/output apparatus IO, based on the flow amount information FLW that is output from the port UPT. The controller BMC determines the operation state of each of the input/output apparatuses IO, based on the average value of the transfer amounts, which is obtained by the port MPT. For example, the controller BMC determines that it is probable that the input/output apparatus IO0 is failed, and causes the input/output apparatus IO0 to execute a BIST when the average value of the transfer amounts is a threshold value or less, which is set beforehand.

The function that performs output of busy information BSY may be removed from the function of the port MPT, and the function that prohibits output of a packet based on a busy signal BSY may be removed from the function of the port UPT. In addition, the function that determines the operation state of each of the input/output apparatuses IO based on the flow amount information FLW may be removed from the function of the port MPT, and the function that measures amounts of pieces of data and the function that performs output of the flow amount information FLW may be removed from the function of the port UPT.

The ports DPT0, DPT1, and DPT2 are, for example, downstream ports are respectively connected to the input/output apparatuses IO0, IO1, and IO2. The ports DPT0, DPT1, and DPT2 output packets that are transferred through the crossbar switch unit CBSW, to the input/output apparatuses IO0, IO1, and IO2 that are connected to the ports DPT0, DPT1, and DPT2, respectively. In addition, the ports DPT0, DPT1, and DPT2 outputs packets that have been output from the input/output apparatuses IO0, IO1, and IO2 that are connected to the ports DPT0, DPT1, and DPT2, to the crossbar switch unit CBSW respectively.

The crossbar switch unit CBSW includes a transfer unit BPSW, a switch SW, an arbitration unit ARB, and a storage unit MNGID. The storage unit MNGID stores an ID (for example, requester ID) that is one of pieces of determination information that is used to identify a port MPT.

The arbitration unit ARB reads a destination address or a destination ID that is included in a packet that is input from each of the ports UPT and MPT to the switch SW, and perform switching of the switch SW in accordance with the read destination. For example, when a destination ID that indicates the input/output apparatus IO0 is included in a packet that is output from the port UPT, the arbitration unit ARB causes the switch SW to perform connection between the ports UPT and DPT0.

In addition, when a packet that is input from each of the ports DPT (DPT0, DPT1, and DPT2) to the switch SW includes the ID of the port MPT that is stored in the storage unit MNGID, the arbitration unit ARB connects the port DPT that has performed output of the packet and the port MPT. That is, the arbitration unit ARB is an example of a detection unit that detects that destination information that is included in a response from each of the input/output apparatuses IO0, IO1, and IO2 is the destination information (indicating the port MPT) that is stored in the storage unit MNGID. When the packet that is input to the switch SW from each of the ports DPT0, DPT1, and DPT2 does not include the ID of the port MPT that is stored in the storage unit MNGID, the arbitration unit ARB connects the port DPT that has performed output the packet to the port UPT.

Due to the arbitration unit ARB and the storage unit MNGID, even when there is a plurality of transfer routes of a packet from the downstream side (input/output apparatus IO) to the upstream side (processor CPU or controller BMC), the packet may be transferred to the processor CPU or the controller BMC.

In addition, the arbitration unit ARB includes a determination unit CFGJ that determines that a command that is output from the port UPT is an assignment command that is used to respectively assign the input/output apparatuses IO0, IO1, and IO2, to the ports DPT0, DPT1, and DPT2. The determination unit CFGJ outputs a control signal that is used to close a bypass switch of the transfer unit BPSW when the assignment command is detected.

For example, the assignment command is a command that is used to assign an address or an ID to the input/output apparatus IO, and is, for example, a configuration access command (configuration write command) in the interface of PCI express standard. For example, the assignment command is issued by the processor CPU when the server SV is started up or when a new input/output apparatus IO is connected to the server SV.

When the transfer unit BPSW receives a control signal that indicates issuance of an assignment command from the determination unit CFGJ, the transfer unit BPSW performs connection between the ports UPT and MPT, and transfers an assignment address or an assignment ID that is transferred from the port UPT to each of the input/output apparatuses IO, to the port MPT. As a result, the port MPT may obtain information on assignment of each of the input/output apparatuses IO without issuing a packet that is used to read the information on the assignment of each of the input/output apparatuses IO. As a result, as compared with a case in which the port MPT issues the packet that is used to read the information on the assignment, the frequency of a conflict may be reduced that occurs between a packet that is output from the port UPT and a packet that is output from the port MPT. That is, a reduction in the access efficiency to the input/output apparatus IO by the processor CPU may be suppressed.

The arbitration unit ARB and the storage unit MNGID may be arranged outside the crossbar switch unit CBSW. In addition, the switch apparatus SWD may have a configuration in which the determination unit CFGJ and the transfer unit BPSW are excluded. In addition, based on the ID of the port MPT that is stored in the storage unit MNGID, the function that connects the port DPT that performs output of a packet to the port MPT may be omitted from the function of the crossbar switch unit CBSW.

Based on the control of the arbitration unit ARB, the switch SW connects the port UPT to one of the ports DPT0, DPT1, and DPT2, or connects the port MPT to one of the ports DPT0, DPT1, and DPT2. In FIG. 2, the ports DPT (DPT0, DPT1, and DPT2) are provided so as to respectively correspond to the input/output apparatuses IO0, IO1, and IO2, but the number of ports DPT may be larger than the number of the input/output apparatuses IO0, IO1, and IO2 that are connected to the server SV. As a result, the input/output apparatuses IO the number of which is three or more are allowed to be connected to the switch apparatus SWD.

Figure 3:
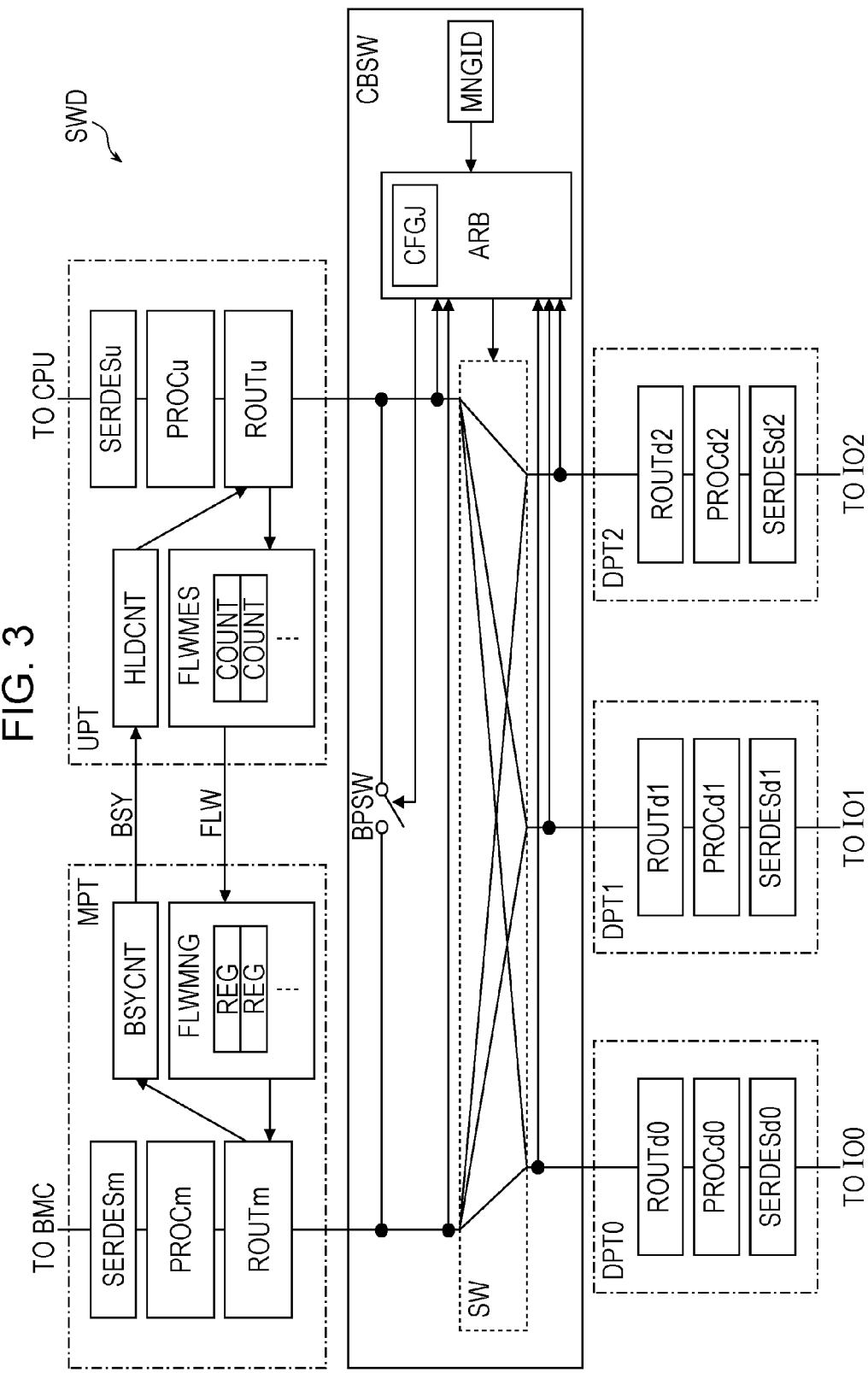
FIG. 3 is a diagram illustrating an example of the switch apparatus illustrated in FIG. 2.

FIG. 3 illustrates an example of the switch apparatus SWD illustrated in FIG. 2. The configuration and the function of the crossbar switch unit CBSW are described above with reference to FIG. 2, so that the description is omitted in FIG. 3.

The port UPT includes a conversion unit SERDESu, a protocol control unit PROCu, a routing unit ROUTu, a hold control unit HLDCNT, and a flow amount measurement unit FLWMES. The conversion unit SERDESu converts a serial signal from the processor CPU into a parallel signal, and outputs the converted parallel signal to the protocol control unit PROCu. In addition, the conversion unit SERDESu converts a parallel signal from the protocol control unit PROCu into a serial signal, and outputs the converted serial signal to the processor CPU. For example, the conversion unit SERDESu is a serializer/deserializer (SerDes), and a signal of PCI express standard is transmitted through a serial bus that is connected to the processor CPU. As described with reference to FIG. 2, the processor CPU is connected to the port UPT through the host bridge that includes the interface of the PCI express standard.

The protocol control unit PROCu decrypts the header of a packet that has been output from the processor CPU, and transmits the decrypt result to the routing unit ROUTu with the packet. The routing unit ROUTu determines a route to the input/output apparatus IO, through which the packet is transferred, based on the information of the header that has been decrypted by the protocol control unit PROCu, and transmits the information that indicates the determined route to the switch SW with the packet.

The routing unit ROUTu suspends the transfer of the packet, based on an instruction from the hold control unit HLDCNT, or restores the suspended transfer of the packet. When the packet from the processor CPU indicates a read access or a write access for the input/output apparatus IO, the routing unit ROUTu outputs a data length that is included in the packet, to the flow amount measurement unit FLWMES as a transfer amount of the data. For example, the routing unit ROUTu is a PCI-to-PCI bridge that is defined by the PCI standard.

The hold control unit HLDCNT instructs the routing unit ROUTu to suspend the transfer of the packet based on busy information BSY, or instructs the routing unit ROUTu to resume the transfer of the packet. The flow amount measurement unit FLWMES includes a counter COUNT that sums up transfer amounts of pieces of data that are received from the routing unit ROUTu, for each of the input/output apparatuses IO. The flow amount measurement unit FLWMES is an example of a summation unit that sums up transfer amounts of pieces of data that are included in the packet from the processor CPU.

The port MPT includes a conversion unit SERDESm, a protocol control unit PROCm, a routing unit ROUTm, a busy control unit BSYCNT, and a flow amount management unit FLWMNG. The conversion unit SERDESm converts a serial signal from the monitor control unit IOCTL of the controller BMC into a parallel signal, and outputs the converted parallel signal to the protocol control unit PROCm. In addition, the conversion unit SERDESm converts a parallel signal from the protocol control unit PROCm into a serial signal, and outputs the converted serial signal into the monitor control unit IOCTL of the controller BMC. For example, the conversion unit SERDESm is a SerDes, and a signal of the PCI express standard is transmitted through a serial bus that is connected to the monitor control unit IOCTL of the controller BMC.

The protocol control unit PROCm decrypts the header of a packet that has been output from the controller BMC, and transmits the decrypt result to the routing unit ROUTm with the packet. The routing unit ROUTm determines a route to the input/output apparatus IO, through which the packet is transferred, based on the information on the header that has been decrypted by the protocol control unit PROCm, and transmits the information on the determined route to the switch SW with the packet. For example, the routing unit ROUTm is a PCI-to-PCI bridge. When a packet is transferred to the input/output apparatus IO, the routing unit ROUTm issues an instruction that is used to cause the busy control unit BSYCNT to perform output of busy information BSY. In addition, the routing unit ROUTm reads an average value of transfer amounts, which is held in a register REG, based on a packet from the controller BMC, which is used to perform read of the register REG of the flow amount management unit FLWMNG, and outputs the read average value to the controller BMC.

The busy control unit BSYCNT performs outputs of busy information BSY, based on an instruction from the routing unit ROUTm. The flow amount management unit FLWMNG reads a flow amount that is held in each of the counters COUNT of the flow amount measurement unit FLWMES, at certain cycles (for example, several hundred millisecond interval or a few second interval). The flow amount management unit FLWMNG includes a plurality of registers REG that respectively correspond to the counters COUNT of the flow amount measurement unit FLWMES. The flow amount management unit FLWMNG subtracts the previously read transfer amount from the currently read transfer amount for each of the counters COUNT (that is, each of the input/output apparatuses IO), and stores the value that is obtained by the subtraction, in the register REG that corresponds to the counter COUNT. That is, for each of the input/output apparatuses IO, the flow amount management unit FLWMNG stores an average value of transfer amounts of pieces of data that are transferred between the port UPT and the input/output apparatus IO, in the register REG. The register REG is an example of a holding unit that holds an average value that is obtained from transfer amounts of pieces of data that are summed up in the flow amount measurement unit FLWMES so that the average value is allowed to be accessed from the controller BMC.

The port DPT0 includes a conversion unit SERDESd0, a protocol control unit PROCd0, and a routing unit ROUTd0. The port DPT1 includes a conversion unit SERDESd1, a protocol control unit PROCd1, and a routing unit ROUTd1. The port DPT2 includes a conversion unit SERDESd2, a protocol control unit PROCd2, and a routing unit ROUTd2.

The conversion units SERDESd0, SERDESd1, and SERDESd2 have the same or similar configurations, so that the conversion unit SERDESd0 is described below as an example. The protocol control units PROCd0, PROCd1, and PROCd2 have the same or similar configurations, so that the protocol control unit PROCd0 is described below as an example. The routing units ROUTd0, ROUTd1, and ROUTd2 have the same or similar configurations, so that the routing unit ROUTd0 is described below as an example.

The conversion unit SERDESd0 converts a serial signal from the input/output apparatus IO0 into a parallel signal, and outputs the converted parallel signal to the protocol control unit PROCd0. In addition, the conversion unit SERDESd0 converts a parallel from the protocol control unit PROCd0 into a serial signal, and outputs the converted serial signal to the input/output apparatus IO0. For example, the conversion unit SERDESu is a SerDes.

The protocol control unit PROCd0 decrypts the header of a packet that has been output from the input/output apparatus IO0, and transmits the decrypt result to the routing unit ROUTd0 with the packet. The routing unit ROUTd0 determines a route to the port UPT or the port MPT through which the packet is transferred, based on the information of the header that has been decrypted by the protocol control unit PROCd0, and transmits the information that indicates the determined route to the switch SW with the packet. For example, the routing unit ROUTd0 is a PCI-to-PCI bridge.

Figure 4:
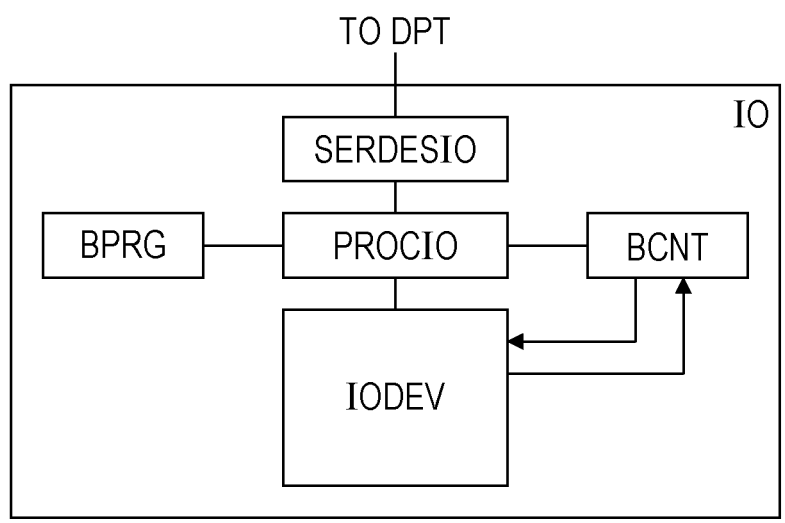
FIG. 4 is a diagram illustrating an example of the input/output apparatus illustrated in FIG. 2.

FIG. 4 illustrates an example of the input/output apparatus IO illustrated in FIG. 2. The input/output apparatus IO illustrated in FIG. 4 is one of the input/output apparatuses IO0, IO1, and IO2 illustrated in FIG. 2. That is, the input/output apparatus IO is a network interface, a host bus adapter, a hard disk drive apparatus, a solid state drive apparatus, or the like.

The input/output apparatus IO includes a conversion unit SERDESIO, a protocol control unit PROCIO, an input/output device IODEV, a test control unit BCNT, and a storage unit BPRG that stores a control program of a BIST (BISTPRG in FIG. 2). For example, the storage unit BPRG is a read only memory (ROM). The control program of a BIST, which is stored in the storage unit BPRG is transferred to the memory MEMm of the controller BMC, in response to an instruction from the controller BMC, based on connection of the input/output apparatus IO to the server SV. That is, the controller BMC outputs a packet that is used to read the control program of a BIST, which is stored in the storage unit BPRG, based on the connection of the input/output apparatus IO to the server SV.

The conversion unit SERDESIO converts a serial signal from the port DPT (one of the ports DPT0, DPT1, and DPT2) into a parallel signal, and outputs the converted parallel signal to the protocol control unit PROCIO. In addition, the conversion unit SERDESIO converts a parallel signal from the protocol control unit PROCIO, into a serial signal, and outputs the converted serial signal to the port DPT. For example, the conversion unit SERDESIO is a SerDes, and a signal of the PCI express standard is transmitted through a serial bus that is connected to the port DPT.

The protocol control unit PROCIO performs write of data to the input/output apparatus IO and read of data from the input/output apparatus IO, based on a packet that is received from the conversion unit SERDESIO. In addition, the protocol control unit PROCIO decrypts the header of a packet that has been output from the input/output apparatus IO, and transmits the decrypt result to the conversion unit SERDESIO with the packet.

In addition, when a packet that is received from the controller BMC through the conversion unit SERDESIO indicates start-up or termination of a BIST of the input/output device IODEV, or inquiry about the result of the BIST, the protocol control unit PROCIO notifies the test control unit BCNT of the packet content. For example, the protocol control unit PROCIO outputs the result of the BIST, which has been received from the test control unit BCNT, to the controller BMC through the conversion unit SERDESIO in response to the inquiry about the result of the BIST.

When a packet that indicates start-up of a BIST is received from the controller BMC through the protocol control unit PROCIO, the test control unit BCNT executes the BIST of the input/output device IODEV. In addition, when a packet that instructs read of the result of the BIST is received from the controller BMC through the protocol control unit PROCIO, the test control unit BCNT outputs the result of the BIST to the protocol control unit PROCIO. In a case in which the test control unit BCNT receives a packet that instructs read of the result of the BIST when the BIST is being executed, the test control unit BCNT outputs information that indicates the BIST is being executed, to the protocol control unit PROCIO. In addition, when the test control unit BCNT receives a packet that instructs termination of the BIST, from the controller BMC through the protocol control unit PROCIO, the test control unit BCNT terminates the BIST.

For example, the control of the BIST of the input/output device IODEV through the test control unit BCNT is achieved when the controller BMC illustrated in FIG. 2 executes the program BISTPRG that is stored in the memory MEMm. The controller BMC issues a packet that is used to read the program BISTPRG that is stored in the storage unit BPRG of the input/output apparatus IO before the BIST of the input/output apparatus IO is executed. In addition, the controller BMC stores the read program BISTPRG in the memory MEMm.

Figure 5:
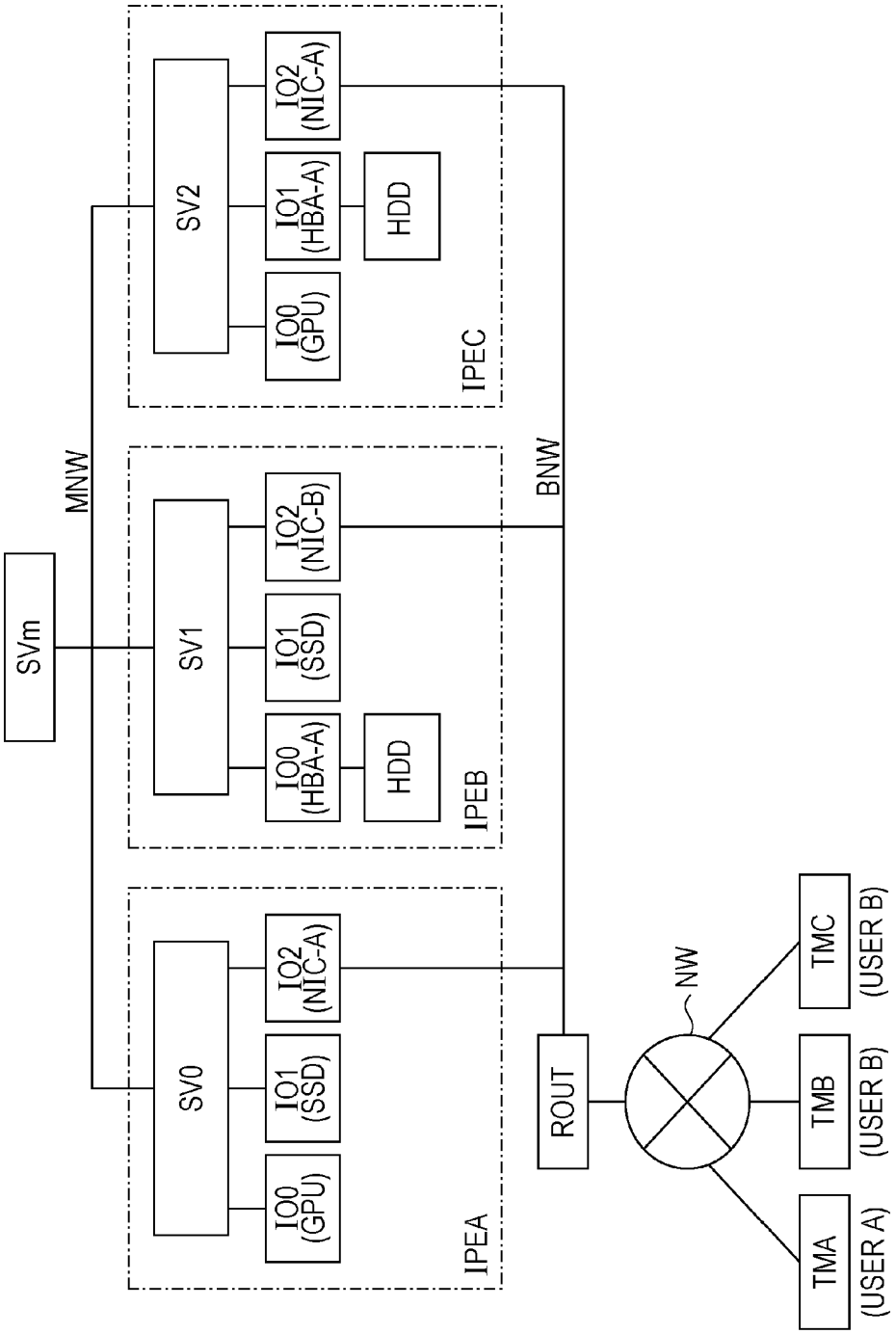
FIG. 5 is a diagram illustrating an example in which the information processing apparatus illustrated in FIG. 2 is used by a user.

FIG. 5 illustrates an example in which the information processing apparatus IPE2 illustrated in FIG. 2 is used by a user. The information processing apparatus IPE2 illustrated in FIG. 2 is one of information processing apparatuses IPEA, IPEB, and IPEC illustrated in FIG. 5. The management server SVm is connected to servers SV0, SV1, and SV2 that correspond to the server SV illustrated in FIG. 2, through a management network MNW, and manages the information processing apparatuses IPEA, IPEB, and IPEC.

In the example of FIG. 5, the information processing apparatus IPEA includes a graphics processing unit (GPU) as the input/output apparatus IO0, and a solid state drive (SSD) as the input/output apparatus IO1. In addition, the information processing apparatus IPEA includes a network interface card (NIC)-A that is connected to an operation network BNW, as the input/output apparatus IO2.

For example, the information processing apparatus IPEB includes a host bus adapter (HBA)-A as the input/output apparatus IO0, a SSD as the input/output apparatus IO1, and a NIC-B that is connected to the operation network BNW, as the input/output apparatus IO2. In addition, the information processing apparatus IPEB includes a hard disk drive (HDD) that is connected to the server SV1 through the HBA-A.

For example, the information processing apparatus IPEC includes a GPU as the input/output apparatus IO0, a HBA-A as the input/output apparatus IO1, and a NIC-A that is connected to the operation network BNW, as the input/output apparatus IO2. In addition, the information processing apparatus IPEC includes a HDD that is connected to the server SV2, through the HBA-A.

Each of the information processing apparatuses IPEA, IPEB, and IPEC is connected to a network NW such as the Internet or Intranet through the operation network BNW and a router ROUT. For example, the information processing apparatus IPEA is accessed through the network NW by a terminal TMA that is managed by a user USERA, and the information processing apparatus IPEB is accessed through the network NW by a terminal TMB that is managed by a user USERB. For example, the information processing apparatus IPEC is accessed through the network NW by a terminal TMC that is managed by a user USERC. That is, FIG. 5 illustrates an example of a computer system by Infrastructure as a Service (IaaS).

FIG. 6 illustrates an example of the configuration table CFGTBL illustrated in FIG. 2. In the example of FIG. 6, the configuration table CFGTBL of the information processing apparatus IPEA illustrated in FIG. 5 is illustrated. The configuration table CFGTBL is updated each time the input/output apparatus IO is connected to the server SV, or is disconnected from the server SV.

The configuration table CFGTBL includes areas that store a device name, a destination ID, a device type, and a state. In the area of the device name, the name of the input/output apparatus IO (for example, apparatus DEV0, DEV1, or DEV2) that is connected to the server SV.

In the area of the destination ID, information that indicates a connection destination of the input/output apparatus IO is stored. FIG. 6 illustrates an example in which three values that respectively indicate a bus number, a device number, and a function number (BDF) are stored as the destination ID when the input/output apparatus IO is connected to the server SV using the interface of the PCI express standard. Information that is stored as the destination ID is not limited to the BDF, and may be a further format or a destination address.

In the area of the device type, information on the type of the input/output apparatus IO0 (GPU, SSD, or NIC-A in this example) is stored. In the area of the state, the state of the input/output apparatus IO ("reset", "disabled", or "enabled") is stored. Here, "reset" indicates the state in which the input/output apparatus IO is not started up, "disabled" indicates the state in which usage of the input/output apparatus IO is prohibited after the start-up, and "enabled" indicates the state in which the input/output apparatus IO is available.

FIG. 7 illustrates an example of the test table TESTTBL illustrated in FIG. 2. In the example illustrated in FIG. 7, the test table TESTTBL of each of the information processing apparatuses IPEA, IPEB, and IPEC illustrated in FIG. 5 is illustrated. For example, the test table TESTTBL holds information that indicates the specification of a test for each of the types (device types) of the input/output apparatuses IO that are allowed to be connected to the server SV.

The test table TESTTBL includes areas that store a device type, a read space, a permission flag, a threshold value, and a test program name. In the area of the device type, the type of the input/output apparatus IO that is connected to the server SV (for example, NIC-A, HBA-A, host channel adapter (HCA)-A, SSD, or the like) is stored similar to the area of the device type of the configuration table CFGTBL (FIG. 6).

In the area of the read space, a base address Bar (one of Bar0 to Bar6), and an address area addr that is indicated by a relative value (offset) for the base address Bar (for example, the range from "addr1" to "addr2"). The read space that is indicated by the base address Bar and the address area addr is a secure address space in which it is committed that a change in the state of the input/output apparatus IO due to a read access does not occur.

In the area of the permission flag, information that indicates permission of execution of a BIST or information that indicates prohibition of execution of a BIST is stored. The areas of the threshold value and the test program name become valid when "permission" is indicated in the permission flag. In the area of the threshold value, a transfer amount of data, which is used to determine start-up of the BIST, is stored. In the area of the program name, the name of a program BISTPRG (for example, BISTPRG1) is stored that controls the BIST, which is started up when an average value of transfer amounts of pieces of data is a threshold value or less. For example, the program BISTPRG is transferred from the storage unit BPRG (FIG. 4) of the input/ output apparatus IO to the memory MEMm of the controller BMC, based on the connection of the input/output apparatus IO to the server SV.

In this example, in the area that indicates the threshold value, information that indicates that 1 KB/s (1 kilobytes per second) is stored. The controller BMC monitors an average value of transfer amounts of pieces of data that are held in the register REG of the port MPT, for each of the input/output apparatuses IO that are connected to the server SV, at certain cycles. When the average value is the threshold value or less, which is held in the test table TESTTBL, the controller BMC executes the program BISTPRG, and instructs the port MPT of the switch apparatus SWD to start up a BIST, and causes the input/output apparatus IO in which a data transfer amount has been reduced to execute the BIST.

As illustrated in FIG. 7, the test specification of the input/output apparatus IO is stored in the test table TESTTBL beforehand for each of the device types, so that a test illustrated in FIG. 11 may be executed without update of the test table TESTTBL even when a new input/output apparatus IO is connected to the server SV. In addition, regardless of the device type, shared parameters (read space, permission flag, threshold value, and program name) are stored in the test table TESTTBL, so that the test program illustrated in FIG. 11 may be shared regardless of the type of the input/output apparatus IO.

FIG. 8 illustrates an example of an operation in which the information processing apparatus IPE2 illustrated in FIG. 2 updates the configuration table CFGTBL. The left side of FIG. 8 illustrates an operation of the controller BMC, and the right side of FIG. 8 illustrates an operation of the port MPT.

The operation flow of the controller BMC is started, for example, based on start-up of the server SV. First, in Step S10, the controller BMC issues a packet that is used to inquire about the specification and state of the input/output apparatus IO that is connected to the server SV, to the port MPT.

After that, in Step S12, the controller BMC reads the specification and state of the input/output apparatus IO, which have been received from the port MPT, for each of the input/output apparatuses IO. After that, in Step S14, the controller BMC updates the configuration table CFGTBL by writing the read specification and state of the input/output apparatus IO onto the configuration table CFGTBL. Steps S12 and S14 are repeated until the specifications and states of all of the input/output apparatuses IO that are connected to the server SV are written onto the configuration table CFGTBL.

After that, in Step S16, in the controller BMC, the processing returns to Step S10 after the controller BMC has slept for a certain time period. In addition, the configuration table CFGTBL is updated for each certain time period.

On the other hand, in Step S20, the port MPT performs output of the specification and state of the input/output apparatus IO that is connected to the server SV, in response to the packet from the controller BMC, which is used to inquire about the specification and state of the input/output apparatus IO that is connected to the server SV. The port MPT receives an assignment command that is issued from the processor CPU, through the transfer unit BPSW beforehand, and holds the specification such as the device type and destination ID, and the state of the input/output apparatus IO that are included in the received assignment command.

Figure 9:
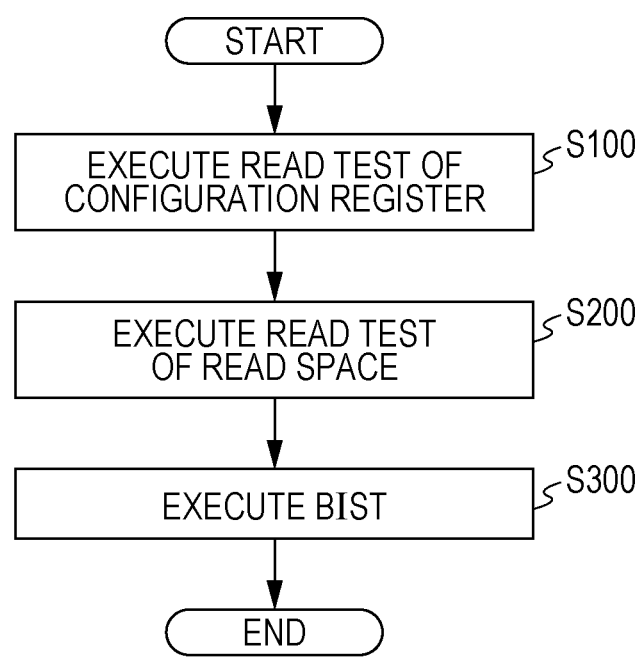
FIG. 9 is a diagram illustrating the outline of a test of the input/output apparatus, which is executed by the information processing apparatus illustrated in FIG. 2.

FIG. 9 illustrates the outline of a test of the input/output apparatus IO, which is executed by the information processing apparatus IPE2 illustrated in FIG. 2. The outline illustrated in FIG. 9 is achieved when the controller BMC executes the program IOPRG and the program BISTPRG. That is, FIG. 9 illustrates a further control method of the information processing apparatus and a control program of the information processing apparatus according to a further embodiment. The test illustrated in FIG. 9 is executed, for each of the input/output apparatuses IO that are connected to the server SV. The specific example of the test illustrated in FIG. 9 is illustrated in FIG. 11. For example, the test illustrated in FIG. 9 is executed at certain cycles.

First, in Step S100, the controller BMC outputs a first read command (packet) that is used to read the configuration register of the input/output apparatus IO, to the input/output apparatus IO through the port MPT. In addition, the controller BMC tests whether or not information that is set to the configuration register is read. That is, a read test of the configuration register is executed. In Step S100, the controller BMC may execute a read test of a further register that is provided in the input/output apparatus IO.

After that, in Step S200, the controller BMC outputs a second read command (packet) that is used to read the read space illustrated in FIG. 7, to the input/output apparatus IO through the port MPT. In addition, the controller BMC tests whether or not information that is stored in the read space is read. That is, the read test of the read space is executed. As illustrated in FIG. 11, Step S200 is executed when the information is read from the configuration register correctly in Step S100.

After that, in Step S300, the controller BMC outputs a test command (packet) that is used to execute a BIST, to the input/output apparatus IO in which "permission" is set to the permission flag illustrated in FIG. 8, through the port MPT. The test control unit BCNT of the input/output apparatus IO that has received the test command executes a BIST of the input/output device IODEV, and outputs the result of the BIST, to the controller BMC through the port MPT. That is, the controller BMC causes the input/output apparatus IO to execute a BIST, and tests whether or not the input/output apparatus IO operates normally. As illustrated in FIG. 11, Step S300 is executed when the information is read from the read space correctly in Step S200.

The BIST in Step S300 is executed when the normal operation is determined in the test of Steps S100 and S200. That is, the controller BMC executes a complicated test in which the load on the input/output apparatus IO is relatively large after executing a simple test in which the load on the input/output apparatus IO is relatively small. As a result, the operation time of the input/output apparatus IO that is operated for a test (restraint time by the test) may be reduced as compared with a case in which Step S300 is executed without execution of Steps S100 and S200. As a result, a probability may be reduced that a conflict occurs between an access to the input/output apparatus IO through the controller BMC and an access to the input/output apparatus IO by the processor CPU. That is, the impact on the processing performance of the processor CPU due to a test of the input/output apparatus IO through the controller BMC may be minimized.

Figure 10:
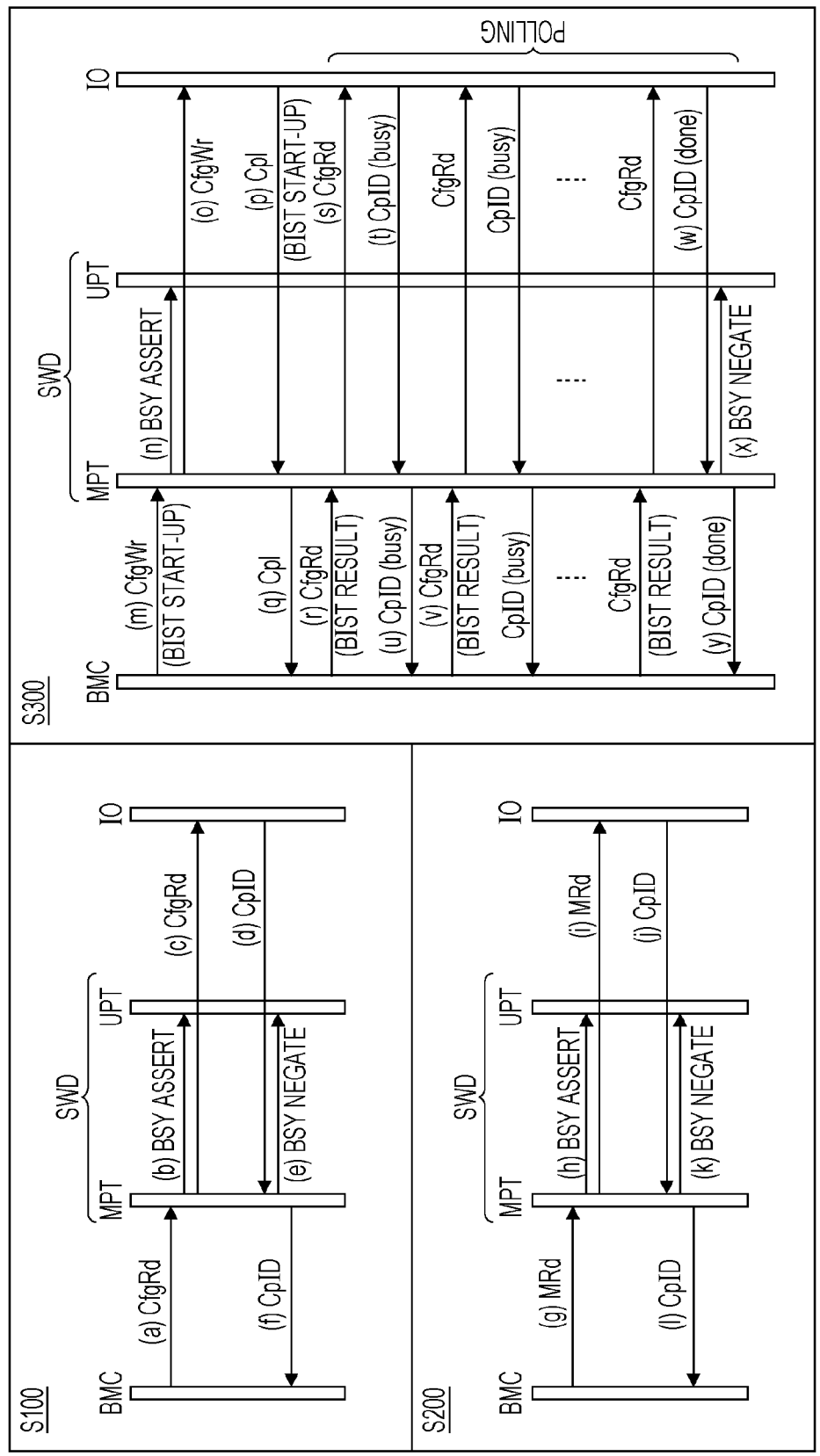
FIG. 10 is a diagram illustrating an example of a flow of processing in each test illustrated in FIG. 9.

FIG. 10 illustrates an example of a flow of processing in each of the tests illustrated in FIG. 9.

In Step S100, the controller BMC outputs a read command CfgRd that is used to read a configuration register of the input/output apparatus IO, to the port MPT of the switch apparatus SWD ((a) in FIG. 10). The port MPT outputs the read command CfgRd to the input/output apparatus IO to be tested ((b) and (c) in FIG. 10) in response to the read command CfgRd after a busy signal BSY has been asserted.

The input/output apparatus IO that has received the read command CfgRd reads the content of the configuration register, and outputs the read content to the port MPT as a completion command CpID (completion with data) ((d) in FIG. 10). The port MPT that has received the completion command CpID negates the busy information BSY, and then outputs the completion command CpID to the controller BMC ((e) and (f) in FIG. 10). When the content of the configuration register, which is included in the completion command CpID, is a normal value, the controller BMC determines that the input/output apparatus IO operates normally. In addition, when the content of the configuration register, which is included in the completion command CpID, is not a normal value, or time-out occurs before the completion command CpID is received, the controller BMC determines that it is probable that the input/output apparatus IO is failed.

In Step S200, the controller BMC outputs a read command MRd that is used to read a memory space of the input/output apparatus IO, to the port MPT of the switch apparatus SWD ((g) in FIG. 10). The port MPT asserts a busy signal BSY, and then outputs the read command MRd to the input/output apparatus IO to be tested in response to the read command MRd ((h) and (i) in FIG. 10).

The input/output apparatus IO that has received the read command MRd reads the content that is held in the specified memory space, and outputs the read content, to the port MPT as a completion command CpID ((j) in FIG. 10). The port MPT that has received the completion command CpID negates the busy information BSY, and then outputs the completion command CpID to the controller BMC ((k) and (l) in FIG. 10). When the content of the memory space, which is included in the completion command CpID, is a normal value, the controller BMC determines that the input/output apparatus IO operates normally. In addition, when the content of the memory space, which is included in the completion command CpID, is not a normal value, or when time-out occurs before the completion command CpID is received, the controller BMC determines that it is probable that the input/output apparatus IO is failed.

In Step S300, the controller BMC outputs a write command CfgWr that is used to cause the input/output apparatus IO to start up a BIST, to the port MPT of the switch apparatus SWD ((m) in FIG. 10). The port MPT asserts a busy signal BSY, and then outputs the write command CfgWr to the input/output apparatus IO that is caused to start up the BIST in response to the write command CfgWr ((n) and (o) in FIG. 10).

The input/output apparatus IO that has received the write command CfgWr starts up the BIST, and outputs a completion command Cpl (Completion without Data) that indicates the start-up of the BIST, to the port MPT ((p) in FIG. 10). The port MPT that has received the completion command Cpl outputs the received completion command Cpl to the controller BMC ((q) in FIG. 10).

After that, the controller BMC outputs a read command CfgRd that is used to read the result of the BIST, to the port MPT of the switch apparatus SWD ((r) in FIG. 10). The port MPT outputs the read command CfgRd to the input/output apparatus IO is response to the read command CfgRd ((s) in FIG. 10).

When the BIST is being executed, the input/output apparatus IO that has received the read command CfgRd outputs the completion command CpID that indicates the BIST is being executed (busy), to the port MPT ((t) in FIG. 10). The port MPT that has received the completion command CpID outputs the received completion command CpID, to the controller BMC ((u) in FIG. 10).

The controller BMC that has received the completion command CpID (busy) outputs a read command CfgRd that is used to read the result of the BIST, to the port MPT of the switch apparatus SWD, again ((v) in FIG. 10). After that, until execution of the BIST through the input/output apparatus IO is terminated, operations that are same as (s), (t), and (u) in FIG. 10 are repeated. That is, the controller BMC inquires about the result of the BIST by polling.

When the input/output apparatus IO receives the read command CfgRd that is used to read the result of the BIST after the BIST has been terminated, the input/output apparatus IO outputs the result of the BIST, to the port MPT as a completion command CpID (done) ((w) in FIG. 10). The port MPT that has received the completion command CpID (done) negates the busy information BSY, and then outputs the completion command CpID (done) to the controller BMC ((x) and (y) in FIG. 10).

When the result of the BIST, which is included in the completion command CpID (done), indicates a normal value, the controller BMC determines that the input/output apparatus IO operates normally. In addition, when the result of the BIST, which is included in the completion command CpID (done) indicates abnormality, or time-out occurs before the completion command CpID (done) is received, the controller BMC determines that the input/output apparatus IO is failed.

FIG. 11 illustrates an example of an operation flow of the test illustrated in FIG. 9. The processing illustrated in FIG. 11 is achieved when the controller BMC executes the program IOPRG and the program BISTPRG. That is, FIG. 11 illustrates a control method of the information processing apparatus IPE2, and illustrates a control program of the information processing apparatus IPE2. The controller BMC executes the processing illustrated in FIG. 11 for each of the input/output apparatuses IO.

In Step S102, the controller BMC refers to the configuration table CFGTBL illustrated in FIG. 6, and determines whether or not the state of the input/output apparatus IO to be tested corresponds to "enabled". When the state of the input/output apparatus IO to be tested corresponds to "enabled", the processing proceeds to Step S104, and when the state of the input/output apparatus IO to be tested corresponds to "disabled" or "reset", the processing proceeds to a test of the next input/output apparatus IO.

In Step S104, the controller BMC reads the content of the configuration register of the input/output apparatus IO to be tested. After that, in Step S106, the controller BMC determines whether or not the content of the configuration register has been read correctly. When the content of the configuration register has been read correctly, the processing proceeds to Step S202, and when the content of the configuration register has not been read correctly, the processing proceeds to Step S314. The processing of Steps S102, S104, and S106 corresponds to the read test of the configuration register of Step S100 illustrated in FIG. 9, and is processing by the program IOPRG.

In Step S202, the controller BMC refers to the test table TESTTBL illustrated in FIG. 7, and determines whether or not the device type of the input/output apparatus IO to be tested has been registered to the test table TESTTBL. When the device type of the input/output apparatus IO to be tested has been registered to the test table TESTTBL, the processing proceeds to Step S204, and when registration of the device type of the input/output apparatus IO to be tested is not performed, the processing proceeds to a test of the next input/output apparatus IO.

In Step S204, the controller BMC refers to the test table TESTTBL, and obtains an address of a memory space from which the data is read, from the area of a read space that corresponds to the device type of the input/output apparatus IO to be tested. In addition, the controller BMC specifies a range of the obtained address, and issues a read command to the input/output apparatus IO to be tested.

After that, in Step S206, the controller BMC determines whether or not the data has been read from the input/output apparatus IO correctly. When the data has been read correctly, the processing proceeds to Step S302, and when the data has not been read correctly, the processing proceeds to Step S314. The processing of Steps S202, S204, and S206 corresponds to the read test of the read space of Step S200 illustrated in FIG. 9, and is processing by the program IOPRG.

In Step S302, the controller BMC refers to the test table TESTTBL illustrated in FIG. 7, and determines whether or not a permission flag of the device type of the input/output apparatus IO to be tested indicates "permission". When the permission flag indicates "permission", the processing proceeds to Step S304, and when the permission flag indicates "prohibition", the processing proceeds to a test of the next input/output apparatus IO.

In Step S304, the controller BMC refers to the test table TESTTBL illustrated in FIG. 7, and obtains a threshold value of the device type of the input/output apparatus IO to be tested. In addition, the controller BMC determines whether or not an average value of transfer amounts of pieces of data of the input/output apparatus IO to be tested, which are held in the register REG of the port MPT, is the threshold value or less. When the average value of the transfer amounts of the pieces of data is the threshold value or less, the processing proceeds to Step S306, and when the average value of the transfer amounts exceeds the threshold value, a test of the next input/output apparatus IO is executed.

In Step S306, the controller BMC instructs the input/output apparatus IO to be tested to start a BIST through the port MPT. The test control unit BCNT of the input/output apparatus IO starts the BIST based on the instruction from the controller BMC. For example, the test control unit BCNT executes the BIST in the background, so that the processor CPU may access the input/output apparatus IO when the BIST is being executed.

After that, in Step S312, the controller BMC determines whether or not an error is detected in the BIST. When an error is not detected in the BIST, that is, when the input/output apparatus IO operates normally, a test of the next input/output apparatus IO is executed. When an error is detected in the BIST, that is, when the input/output apparatus IO does not operate normally, the processing proceeds to Step S314.

In Step S314, the controller BMC notifies the management server SVm of the abnormality in the tested input/output apparatus IO. For example, the management server SVm that has received the notification displays a message that prompts the maintenance and inspection, on an administrator display. After that, the test of the next input/output apparatus IO is executed. The processing of Steps S302, S304, S306, S312, and S314 corresponds to the processing of the execution of the BIST in Step S300 illustrated in FIG. 9, and is processing by the program BISTPRG.

FIG. 12 illustrates a further example of the operation flow of the test illustrated in FIG. 9. In FIG. 12, the detailed description of processing that is the same as or similar to the processing of FIG. 11 is omitted herein. The processing illustrated in FIG. 12 is achieved when the controller BMC executes the program IOPRG and the program BISTPRG. That is, FIG. 12 illustrates a control method of the information processing apparatus IPE2, and illustrates a control program of the information processing apparatus IPE2.

In the processing illustrated in FIG. 12, the processing is similar to the processing of FIG. 11 except that Step S308 is added between Step S306 and Step S312 in FIG. 11, and Step S310 is newly added.

In Step S308, the controller BMC determines whether or not an average value of the transfer amounts, which is stored in the register REG of the port MPT, that is, an average value in the input/output apparatus IO to be tested exceeds the threshold value after the BIST has been started. When the average value exceeds the threshold value, the processing proceeds to Step S310, and when the average value is threshold value or less, the processing proceeds to Step S312.

In Step S310, the controller BMC instructs the input/output apparatus IO in which the BIST is being executed to terminate the BIST, through the port MPT. For example, the controller BMC outputs a termination command (termination packet) that is used to cause the input/output apparatus IO in which the BIST is being executed to terminate the BIST. The test control unit BCNT of the input/output apparatus IO terminates the execution of the BIST, based on the instruction from the controller BMC. The processing of Steps S302, S304, S306, S308, S310, S312, and S314 corresponds to the processing of the execution of the BIST in Step S300 illustrated in FIG. 9, and is processing by the program BISTPRG.

In FIG. 12, after the BIST has been started, for example, when a packet that indicates a write request or read request of data is output from the processor CPU to the input/output apparatus IO, and an average value of transfer amounts of pieces of data exceeds the threshold value, the BIST is terminated. The average value of the transfer amounts of pieces of data is the threshold value or less when the input/output apparatus IO is failed, and for example, the average value of the transfer amounts of pieces of data is the threshold value or less when the input/output apparatus IO is in a sleep mode, or data transfer between the processor CPU and the input/output apparatus IO is temporarily suspended for some reason. In this case, when the data transfer between the processor CPU and the input/output apparatus IO is resumed, the access efficiency to the input/output apparatus IO through the processor CPU may be improved by terminating the BIST, as compared with the BIST is executed in the background. As a result, the impact on the processing performance of the processor CPU due a test of the input/output apparatus IO through the controller BMC may be minimized.

As described above, even in the embodiment, similar to the embodiment illustrated in FIG. 1, a route from the processor CPU to the switch SW and a route from the controller BMC to the switch SW are provided separately from each other. In addition, due to the flow amount measurement unit FLWMES and the flow amount management unit FLWMNG, the frequency of the BIST of the input/output apparatus IO may be reduced as compared with the frequency when the BIST is executed at certain cycles. In addition, due to the determination unit CFGJ and the transfer unit BPSW, the controller BMC may obtain information that indicates assignment of the input/output apparatus IO without affecting the operation of the processor CPU. As a result, a probability may be reduced that a conflict occurs between a packet from the controller BMC and a packet from the processor CPU.

In addition, due to a busy signal BSY, a conflict may be avoided that occurs between an access from the controller BMC to the input/output apparatus IO and an access from the processor CPU to the input/output apparatus IO, and the erroneous operation of the processor CPU may be avoided.

In addition, in the embodiments described with reference to FIGS. 2 to 12, the following effects may be obtained. Due to the arbitration unit ARB and the storage unit MNGID, even when there a plurality of transfer routes of a packet from the downstream side (input/output apparatus IO) to the upstream side (processor CPU or controller BMC), the packet may be transferred to the processor CPU or the controller BMC.

As illustrated in FIGS. 11 and 12, the controller BMC causes the input/output apparatus IO to execute a test in which the load on the input/output apparatus IO is relatively small (read of the configuration register or read of the read space). In addition, when the test is passed, the controller BMC causes the input/output apparatus IO to execute a BIST in which the load on the input/output apparatus IO is relatively large. As a result, the operation time (restraint time by the test) in which the input/output apparatus IO is operated for the test may be reduced, as compared with a case in which a BIST is executed without executing read tests of the configuration register and the read space.

As a result, a probability may be reduced that a conflict occurs between an access by the controller BMC and an access by the processor CPU, and the impact on the processing performance of the processor CPU due to the test of the input/output apparatus IO through the controller BMC may be minimized.

In addition, by terminating a BIST when an transfer amount of data is increased during the BIST, the access efficiency to the input/output apparatus IO through the processor CPU may be improved as compared with a case in which the BIST is executed in the background.

In addition, even when a new input/output apparatus IO is connected to the server SV, the test illustrated in FIGS. 11 and 12 may be executed without updating the test table TESTTBL. In addition, shared parameters are stored in the test table TESTTBL regardless of the device type, so that the test program (FIGS. 11 and 12) that is executed by the controller BMC may be shared regardless of the type of the input/output apparatus IO. By providing the configuration table CFGTBL and the test table TESTTBL, a test may be executed in accordance with the type of the input/output apparatus IO.

For example, when the server SV0 illustrated in FIG. 5 does not include the functions of the controller BMC and the switch apparatus SWD illustrated in FIG. 2, a failure of the input/output apparatus IO is left until the user USERA who uses the server SV0 notices the failure. The user USERA who has noticed the failure of the input/output apparatus IO notifies an operator of the computer system of the failure through the management server SVm and the like, and requests exchange of the input/output apparatus IO. For example, the failure of the input/output apparatus IO is found out when an operating system (OS) that is used by the user USERA detects an error, or when an application detects an error. Alternatively, the failure of the input/output apparatus IO is detected by monitor software that is called an agent that is installed on the server SV0 that has been lent to the user USERA. The monitor software is created so as to correspond to an OS, so that an OS that is allowed to be used by the user USERA is limited when there is no monitor software that corresponds to the OS used by the user USERA.

On the contrary, in the above-described embodiments, a failure of the input/output apparatus IO may be automatically detected without installation of the monitor software. In addition, the failure of the input/output apparatus IO may be automatically detected without limitation of an OS and application that are allowed to be used by the user. That is, the failure of the input/output apparatus IO may be automatically detected during the operation of the user system that is achieved by a server without the burden on the user who utilizes the computer system such as IaaS, and without a reduction in the performance of the user system.

In the above detailed description, the features and advantages of the embodiments will become apparent. This is intended to extend the range of the appended claims without departing from the spirit and scope to the features and advantages of the embodiments as described above. In addition, any modifications and changes should be readily apparent for those skilled in the art. Therefore, the scope of the embodiments having inventiveness are not intended to be limited to those described above, and may also correspond to the appropriate improvements and equivalents contained in the range disclosed in the embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A switch apparatus that connects an arithmetic processing apparatus that executes calculation and a control apparatus that controls the arithmetic processing apparatus, to an input/output apparatus that performs input and output of information, the switch apparatus comprising:
   a switch unit that connects one of the arithmetic processing apparatus and the control apparatus, to the input/output apparatus;
   a first input/output control unit that outputs a first command that is received from the arithmetic processing apparatus to the input/output apparatus through the switch unit, receives a response from the input/output apparatus that is operated based on the first command, through the switch unit, and outputs the received response to the arithmetic processing apparatus; and
   a second input/output control unit that outputs a second command that is received from the control apparatus, to the input/output apparatus through the switch unit, receives a test result of the input/output apparatus that is tested based on the second command, through the switch unit, and outputs the received test result to the control apparatus.

2. The switch apparatus according to claim 1, wherein
   the first input/output control unit includes a summation unit that sums up transfer amounts of pieces of data that are included in the first command, and the second input/output control unit includes a holding unit that holds an average value that is obtained from the transfer amounts that are summed up by the summation unit so that the average value is allowed to be accessed from the control apparatus.

3. The switch apparatus according to claim 1, wherein the second input/output control unit outputs a busy signal to the first input/output control unit, in a time period from output of the second command to reception of the test result, and
the first input/output control unit prohibits output of the first command to the switch unit when the first input/output control unit receives the busy signal.

4. The switch apparatus according to claim 1 further comprising:
a determination unit that determines that the first command is an assignment command that is used to instruct assignment of the input/output apparatus; and
a transfer unit that connects the first input/output control unit to the second input/output control unit, and transfers the assignment command that is output from the arithmetic processing apparatus to the switch unit, to the second input/output control unit when the determination unit determines that the first command is the assignment command.

5. The switch apparatus according to claim 1 further comprising:
a storage unit that stores destination information that indicates a destination of the second input/output control unit; and
a detection unit that detects that a destination that is include in the response from the input/output apparatus correspond to the destination information that is stored in the storage unit, wherein
the switch unit connects the input/output apparatus to the second input/output control unit, and transmits the response from the input/output apparatus, to the second input/output control unit when the detection unit detects that the destination information that is stored in the storage unit is included in the response from the input/output apparatus.

6. An information processing apparatus comprising:
an arithmetic processing apparatus that executes calculation;
a control apparatus that controls the arithmetic processing apparatus;
an input/output apparatus that performs input and output of information;
a switch apparatus that connects the arithmetic processing apparatus and the control apparatus, to the input/output apparatus, the switch apparatus including:
a switch unit that connects one of the arithmetic processing apparatus and the control apparatus, to the input/output apparatus,
a first input/output control unit that outputs a first command that is received from the arithmetic processing apparatus, to the input/output apparatus through the switch unit, receives a response from the input/output apparatus that is operated based on the first command, through the switch unit, and outputs the received response to the arithmetic processing apparatus, and
a second input/output control unit that outputs a second command that is received from the control apparatus, to the input/output apparatus through the switch unit, receives a test result of the input/output apparatus that is tested based on the second command, through the switch unit, and outputs the received test result to the control apparatus.

7. The information processing apparatus according to claim 6, wherein
the first input/output control unit includes a summation unit that sums up transfer amounts of pieces of data that are included in the first command;
the second input/output control unit includes a holding unit that holds an average value that is obtained from the transfer amounts that are summed up by the summation unit so that the average value is allowed to be accessed from the control apparatus, and
the control apparatus outputs a test command that is used to start up a test of the input/output apparatus, to the second input/output control unit, as the second command when the average value of the transfer amounts, which is held by the holding unit, is a certain threshold value or less.

8. The information processing apparatus according to claim 7, wherein
the control apparatus outputs a termination command that is used to terminate the test, to the second input/output control unit as the second command when the average value of the transfer amounts, which is held in the holding unit, exceeds the threshold value when the input/output apparatus is executing the test.

9. The information processing apparatus according to claim 7, wherein
the control apparatus outputs a read command that is used to read information that is set to the input/output apparatus, to the second input/output control unit as the second command before the output of the test command is performed, and
the test command is output to the second input/output control unit when the information from the input/output apparatus is not allowed to be read as the test result through the second input/output control unit.

10. The information processing apparatus according to claim 6, wherein
the control apparatus includes a test table that stores a condition of a test for each type of the input/output apparatus, and performs the output of the second command in accordance with the condition that is stored in the test table.

11. The information processing apparatus according to claim 6, wherein
the switch apparatus includes a determination unit that determines that the first command is an assignment command that is used to instruct assignment of the input/output apparatus, and a transfer unit that connects the first input/output control unit to the second input/output control unit, and transfers the assignment command that is output from the arithmetic processing apparatus to the switch unit, to the second input/output control unit when the determination unit determines that the first command is the assignment command, and
the control apparatus includes a configuration table that stores information that indicates assignment of the input/output apparatus, which is included in the assignment command that is transferred from the first input/output control unit, and generates the second command using the information that indicates the assignment of the input/output apparatus that is stored in the configuration table.

12. A control method of an information processing apparatus that includes an arithmetic processing apparatus that executes calculation, a control apparatus that controls the arithmetic processing apparatus, an input/output apparatus that performs input and output of information, and a switch apparatus that includes a switch unit that connects the input/output apparatus to one of the arithmetic processing apparatus and the control apparatus, the control method causing the switch apparatus to execute a process, the process comprising:

outputting a first command that is received from the arithmetic processing apparatus to the input/output apparatus through the switch unit, receiving a response from the input/output apparatus that is operated based on the first command, through the switch unit, and outputting the received response to the arithmetic processing apparatus; and outputting a second command that is received from the control apparatus, to the input/output apparatus through the switch unit, receiving a test result of the input/output apparatus that is tested based on the second command, through the switch unit, and outputting the received test result to the control apparatus.

13. The control method of the information processing apparatus, according to according to claim 12, wherein the control apparatus monitors transfer amounts of pieces of data that are transferred between the arithmetic processing apparatus and the input/output apparatus, outputs a test command that is used to test the input/output apparatus, to the input/output apparatus as the second command when an average value of the transfer amounts is a certain threshold value or less, receives a test result of the input/output apparatus that is tested based on the test command through the switch unit, and determines appropriateness of the input/output apparatus.

14. A non-transitory storage medium having stored therein a control program that controls an information processing apparatus that includes an arithmetic processing apparatus that executes calculation, a control apparatus that controls the arithmetic processing apparatus, an input/output apparatus that performs input and output of information, a switch apparatus including a switch unit that connects the input/output apparatus to one of the arithmetic processing apparatus and the control apparatus, and the control program causing the control apparatus to execute a process, the process comprising:

monitoring transfer amounts of pieces of data that are transferred between the arithmetic processing apparatus and the input/output apparatus;

outputting a test command that is used to test the input/output apparatus, to the input/output apparatus through the switch unit when an average value of the transfer amounts is a certain threshold value or less;

receiving a test result of the input/output apparatus that is tested based on the test command, through the switch unit; and determining appropriateness of the input/output apparatus.

\* \* \* \* \*